July 11, 1967 S. R. ZIMMERLEY 3,330,096
USE OF DEEP-SEA NODULES FOR REMOVING SULFUR COMPOUNDS FROM GASES
Filed Feb. 19, 1965
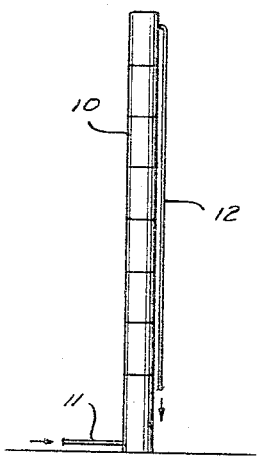
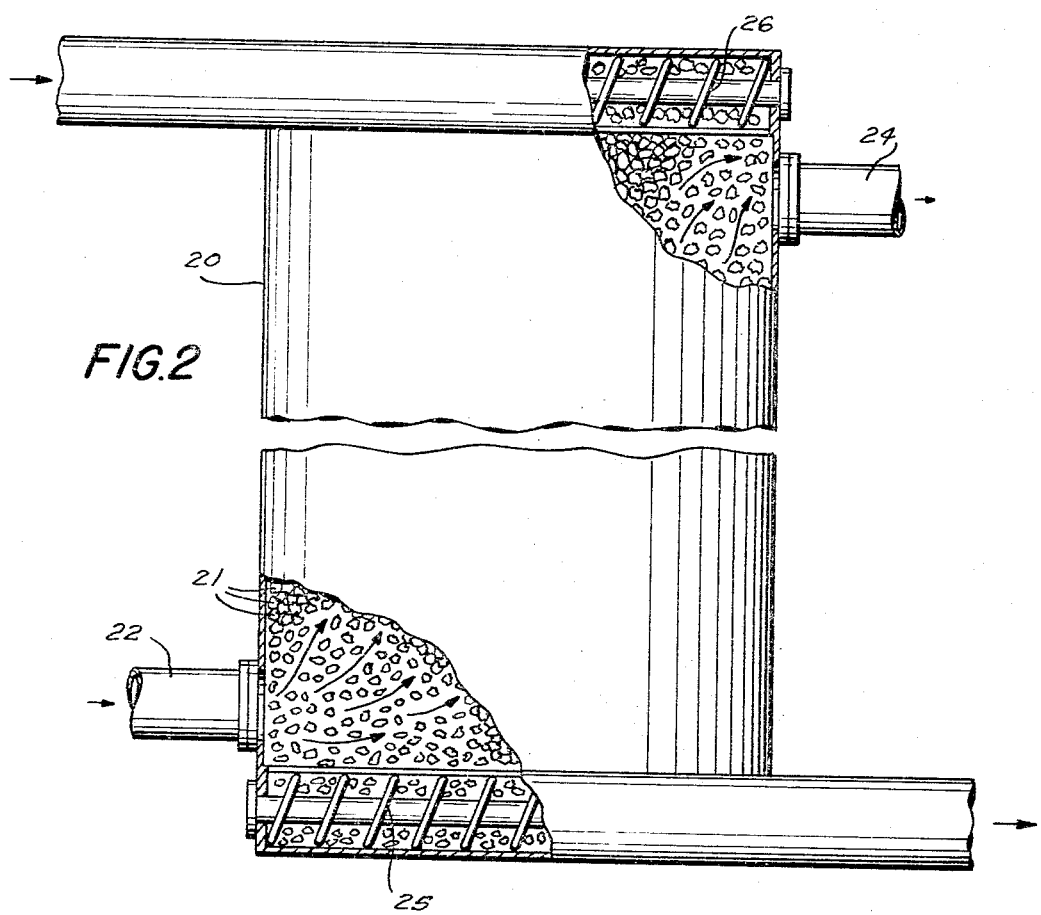
INVENTOR
STUART R. ZIMMERLEY
BY
Frank E. Robbins
ATTORNEY

United States Patent Office 3,330,096
Patented July 11, 1967

3,330,096
USE OF DEEP-SEA NODULES FOR REMOVING SULFUR COMPOUNDS FROM GASES
Stuart R. Zimmerley, Salt Lake City, Utah, assignor to Kennecott Copper Corporation, New York, N.Y., a corporation of New York
Filed Feb. 19, 1965, Ser. No. 433,953
18 Claims. (Cl. 55—73)

This invention relates to techniques for making economic use of manganese nodules recovered from deep sea mining operations. The invention also relates to processes for the removal of sulfur-containing gases from gas streams containing them. More particularly, the invention is addressed to processes for removing sulfur-containing gases, such as, for example, sulfur dioxide, from polluted atmospheres, from the waste gases from heating and power plants, and from smelter gases, utilizing manganese nodules.

Deposits of "manganese nodules" are found on the sea floor at depths of 1000 feet and greater. These nodules lie exposed on the sea floor, either directly on the surface of the sea floor, or buried beneath its surface. Although at one time it was thought that the nodules were concentrated on the surface of the sea floor and within a few inches of the surface of the sea floor, it is now recognized that these nodules are distributed to indeterminate depths beneath the surface of the sea floor. Deposits of these nodules have been observed in many places, such as, for example, on the floor of the North American Basin, off the coast of Florida.

These nodules contain manganese in substantial quantity, and in addition, lesser amounts of copper, cobalt, and nickel. They vary in size and shape. They tend to be spherical, often having an average sphericity on the order of about 0.6. Their largest dimension may be up to about 8 inches or larger.

As is the case with most mineral deposits, the composition of these nodules varies. Observations of samples from one lot of several tons of these nodules indicated the following properties:

TABLE 1
*Manganese nodules—Physical data*

| | |
|---|---|
| Moisture content, percent | 21.3 |
| Bulk density, lbs. per cubic foot | 66.5 |
| Specific gravity of dried solids from nodules | 3.26–3.35 |
| Porosity of dried solids from nodules, percent void space | 41.8–58.6 |
| Loss on ignition at 900° C., percent dry basis | 18.0 |

TABLE 2
*Manganese nodules—Chemical data*

| Elements: | Assay, percent |
|---|---|
| Manganese | 24.9 |
| Copper | 0.71 |
| Nickel | 1.08 |
| Cobalt | 0.15 |
| Iron | 9.9 |

The balance comprises a mixture of many substances, including significant amounts of silica, alumina, insolubles, and calcium and magnesium oxides, together with smaller amounts of zinc, chlorine, and other materials.

Samples of the nodules from other locations revealed a generally similar chemical constitution, differing however in the proportions of the various materials present. For example, some other large quantities of nodules have had substantially smaller contents of the metal values identified in Table 2, but in generally similar relative amounts.

While manganese nodules are undoubtedly an important mineral resource for mankind, at the present time, they are in economic competition with other mineral resources whose metallurgical responses are fairly well understood, and for which there are processes to recover metal values at relatively low cost.

One object of the present invention is to provide economically attractive and practical uses for manganese nodules, that will make their mining economically attractive.

Another object of the invention is to provide new and useful processes for preventing atmospheric pollution, or for removing pollutants from the atmosphere.

A more specific object of the invention is to provide a practical application for manganese nodules, that will permit, if desired, recovery of metal values therefrom at a reasonable cost.

Other objects of the invention will be apparent hereinafter from the specification and from the recital of the appended claims.

I have found that manganese nodules, as recovered by deep sea mining operations, have the proper size, texture and strength to permit their disposition in a highly permeable bed, as tower packing, and that the nodules contain manganese in a highly active form that permits the rapid removal of sulfur dioxide and other sulfur-containing materials from gases. I have found that by taking advantage of these characteristics of the manganese nodules, sulfur compounds can be removed from gas streams economically and efficiently, without expensive chemical processing or mechanical forming steps that are often characteristic of other techniques for removing sulfur compounds.

Typical applications, for which the nodules are particularly well suited, are the removal of sulfur compounds from polluted atmospheres, to provide substantially sulfur-free atmospheres in critical enclosures or buildings such as, for example, hospitals and factories, particularly in high-pollution areas, and the removal of sulfur compounds, particularly sulfur dioxide, from the waste gases from heating and power plants, and from smelter gases, and in filters on the exhaust lines of diesel engines where the exhaust is substantially free from unburned components.

One of the important advantages of using manganese nodules for removing sulfur compounds from gas streams, and particularly for removing sulfur compounds from polluted atmospheres where the concentration of sulfur compounds is extremely low, is the extremely high scavenging efficiency of the nodules. The nodules will remove sulfur dioxide with 98% or greater efficiency, even when the amount of sulfur dioxide present in a gas stream is measured in a small number of parts per million. The natural porosity of the nodules complements the high reactivity of the manganese compounds to produce this high scavenging efficiency.

The invention will be better understood by reference to certain specific embodiments thereof, that will make more clear some of the details that are important for economical practice of the invention.

In the drawing:

FIGURE 1 is a side elevation of a packed power for holding manganese nodules, for removing sulfur compounds from a gas stream to be passed through the tower, in accordance with one embodiment of this invention, and FIGURE 2 is a fragmentary part side elevation, part section, on an enlarged scale, of a packed tower that is constructed with accordance with another embodiment of this invention.

Referring now in greater detail to the drawings, FIG. 1 illustrates a tower 10 for holding a columnar bed of manganese nodules. The tower is equipped at its lower end with a gas inlet pipe 11 and at its upper end with a gas discharge pipe 12. The tower is equipped with means (not shown) for permitting easy loading of the nodules into the tower, and for removal of the nodules from the tower.

A tower such as this may be easily employed for removing sulfur compounds such as, for example, sulfur dioxide, from a gas stream by causing the gas stream to enter the tower through the inlet line 11, pass upwardly through a bed of nodules in the tower, and discharge through the line 12, substantially free from sulfur compounds. For this kind of installation, it is preferred that at least two such towers be used, connected to the gas lines in parallel, so that the towers may be used alternately, to permit discharging of spent nodules from one tower, and its charging with fresh nodules, while the other tower is on stream.

Another way in which the invention can be practiced is with a tower of the kind illustrated in FIG. 2. This tower 20 is also formed to contain a column of manganese nodule bodies 21. These nodule bodies may be nodules as mined, nodule fragments, or a mixture of both. It is equipped at its lower end with a gas inlet pipe 22, and at its upper end with a gas discharge line 24. A screw conveyor 25, or some similarly-operating mechanism, is disposed at the lower end of the tower, for continuously removing spent nodule bodies from the lower end of the tower. The removed material is to be transported to some location remote from the tower, for further processing, as will be described presently. Similarly, a screw conveyor 26, or some similarly-operating device, is disposed at the upper end of the tower, contonuously to provide a supply of fresh nodule bodies to the tower, to replace those that are withdrawn by the conveyor 25 at the lower end of the tower.

Specific applications of the use of manganese nodules, for removing sulfur compounds from a gas stream, will now be described in some detail, better to illustrate the invention. In the following example and elsewhere herein, gas concentrations are given as volume (molecular) percentages, and other percentages are by weight.

EXAMPLE 1

*Removal of sulfur dioxide from heating plant waste gas*

A composite mixture of manganese nodules, mined from several different areas of the sea floor, was screened to remove fragments having a maximum dimension of less than one inch. The screened nodules had the following nominal analysis:

TABLE 3

*Chemical analysis—Nodule composite*

| Element: | Percent |
|---|---|
| Manganese | 26 |
| Nickel | 1.2 |
| Copper | 0.7 |
| Cobalt | 0.2 |
| Iron | 11 |

In addition, this nodule composite contained substantial amounts of calcium, aluminum and silicon, present in the form of clay-like silicates. The manganese was present primarily in the form of its oxides.

Waste gas from a large heating plant was passed upwardly through a tower packed loosely with this nodule composite. The sulfur dioxide level of the waste gas was consistently in the range from 0.33% to 0.35%. The flow rate of the waste gas was such as to provide an hourly space velocity (volume of gases per hour/volume of absorbent) of 500 to 575. Operations that were conducted at temperatures of 350° F. and 425° F., at the point where the gas stream entered the column, indicated a somewhat greater absorption efficiency at the lower temperature.

When fresh, the nodules absorb 100% of the sulfur dioxide in the incoming gas stream. However, after the nodules have absorbed 5% to 6% by weight of sulfur dioxide, the absorption efficiency is somewhat reduced. For this reason, it is preferred, particularly for large volume operations, to use two or more towers in series. Moreover, it has been observed that removal of partly spent nodules from the column, washing them to expose fresh absorbent surfaces, and replacing the washed nodules in the tower, permits them again to absorb sulfur dioxide with a high rate of efficiency. For optimum results, and to permit absorption to continue at a high level of efficiency, the nodule layer in the lower portion of each tower should be removed and replaced, when it has absorbed not more than about 25%, and preferably not more than about 15% to about 20%, of its own weight of sulfur compounds.

A portion of the nodule composite, substantially in the as-mined state, was screened and reduced in size to produce a fraction in which the nodule fragments had a maximum dimension of just less than one inch, and a minimum dimension of just above about ¼ inch. These fragments were then used for loosely packing a column of the kind shown in FIG. 1. This column was then operated on the same gas stream, at temperatures, at the point where the gas stream entered the column, of 300° F., 350° F. and 420° F., respectively. The greatest efficiency was observed during operation at about 350° F.

The nodule fragments maintained 100% absorption efficiency for a longer period of time than the larger sized nodules, as mined. A high degree of absorption efficiency was observed even after the lower portion of the column had absorbed almost 25% of its own weight of sulfur dioxide. As was the case with the as-mined nodules, the nodule fragments could be returned to a high degree of absorption efficiency by removal from the column, washing to expose fresh absorption surfaces, and return to the column.

Both the sulfated nodules and nodule fragments proved to be readily amenable to leaching with water, for recovery of the manganese, nickel and copper values that had been sulfated and hence had become soluble.

EXAMPLE 2

*Removal of sulfur dioxide from reverberatory furnace gas and the like*

In this demonstration of the invention, reverberatory furnace gas having a sulfur dioxide content of from about 1.0% to about 1.2% was passed upwardly through a column of nodule fragments of the size used in Example 1, at an hourly space velocity of 825.

After the nodule fragments in the lower end of the column had absorbed a little more than 20% of their own weight of sulfur dioxide from the gas stream, the nodule fragments at the bottom of the column exhibited a noticeable decrease in absorption efficiency. Accordingly, the nodule fragments were removed from the bottom portion of the column, the remainder of the column was permitted to move down to replace the removed nodule fragments, and fresh nodule fragments were fed to the upper end of the column. A high degree of absorption efficiency was thus maintained.

Upon examination of the removed nodule fragments, it was found that about 10% of the manganese in the removed nodule fragments had been converted to the sulfate, and that about 13% of the copper and 19% of the nickel was water soluble. Upon leaching a portion of these removed nodule fragments with a 20% sulfuric acid solution, it was found that a substantial portion of the manganese content of the fragments dissolved, and that very large portions of the copper and of the nickel went into solution.

The immediately foregoing demonstration of the invention was repeated with a modification. In this modification, the nodule fragments were all of a size having a minimum dimension larger than one inch, and a continuous trickle of water was maintained throughout the column. The water was introduced at the head of the column and was permitted to travel its own way down through the column. A high degree of absorption efficiency was maintained with the same column of nodule fragments, over a longer period of time than had been possible without the leaching.

The decreased efficiency was caused by the development of clay-like slimes on the surface of the nodules. When the nodules were removed from the column and sprayed with a fine water spray, to remove the slimes and expose fresh surfaces, the nodules were found, after replacement in the column, to have regained substantially their original absorption efficiency.

The pregnant leaching liquid that was collected at the bottom of the tower contained a very substantial proportion of the manganese, nickel and copper values that had been solubilized through the absorption of sulfur dioxide.

In further demonstrations of the invention, for absorbing sulfur dioxide from reverberatory furnace gases, the nodule fragments were continuously removed and continuously replenished, in a tower of the kind illustrated in FIGURE 2. The removed nodules were, in some cases, washed to leach out the solubles and to expose fresh absorption surfaces, and then returned to the tower, and in other cases were simply processed to recover manganese values. In order to maintain the tower at a high rate of absorption efficiency, the removal and replenishment rates were adjusted so that the removed nodules had absorbed about 15% of their own weight of sulfur dioxide. Satisfactory results were obtained when the amount of sulfur dioxide absorbed was in the range from about 15% to about 25% by weight of the nodule fragments. However, best results were obtained when the amount absorbed was kept toward the low end of this range. In addition, higher efficiencies were obtained when lower space velocities were employed, in general.

EXAMPLE 3

*Removal of sulfur dioxide pollutant from the atmosphere*

Nodule fragments were made from a nodule composite, having a particle size having a largest dimension below about one inch and a smallest dimension about ¼ inch. A column of these fragments was used for treating air that was being furnished to an enclosure where the atmosphere had to be substantially free from sulfur dioxide. The sulfur dioxide concentration in the atmosphere about the enclosure was in the range from about 23 to about 26 parts per million, which is a relatively high level, representing a fairly serious pollution problem.

The temperature varied during operations from about 45° to about 61° F. The air was passed through the column at an hourly spaced velocity of 11,000. Efficiency of removal of sulfur dioxide was better than 98%, placing this technique for removing sulfur dioxide atmospheric pollutant gases within the range of practicability for purifying air for hospitals and other public buildings located in areas having a high atmospheric sulfur dioxide level.

It has been observed in such applications that the efficiency of the nodule fragments tends to drop off because of the accumulation of dust and smoke particles on the surfaces of the fragments, long before the fragments have absorbed sulfur dioxide to capacity. Accordingly, if the metal values in the nodules are to be recovered after they have been used in such an application, somewhat different techniques are required than would be the case for reverberatory furnace or smelter gas operations, for example.

EXAMPLE 4

*Absorption of atmospheric hydrogen sulfide*

In a further demonstration of the invention, polluted air containing up to about 10 parts per million of hydrogen sulfide had 88% or more of its hydrogen sulfide removed upon passage through a column of nodule fragments of the size employed in the previous example, at an hourly space velocity of 10,000. Upon lowering the hourly space velocity to 5,500, 95% of the hydrogen sulfide was removed when using the same column.

EXAMPLE 5

*Removal of sulfur dioxide from power plant gases*

Another demonstration of the invention may be made with power plant gas having a sulfur dioxide content of about 0.04%. The exhaust gases from a typical power plant are at the rate of 19 million cubic feet per hour. To process this stream, series-connected columns holding 19,000 cubic feet of nodules or nodule fragments, which is about 1,000 tons, is preferred, to permit operation at a space velocity of about 1,000.

With continuous removal and replenishment of nodules, for example in the fashion shown in FIGURE 2, the nodules or nodule fragments are consumed at the rate of about 53 tons per day. The spent nodules or nodule fragments yield about 40% of their manganese values upon leaching with dilute sulfuric acid.

GENERAL

The efficiency of absorption of sulfur-containing compounds by the manganese nodules or nodule fragments is, as has been demonstrated, extremely high, particularly with respect to scavenging ability, although the efficiency tends to drop off as substantial amounts by weight of sulfur compounds are absorbed. Also, it has been observed that lower space velocities not only improve absorption efficiencies but also permit higher recoveries of manganese values from the spent material.

One of the important features of the present invention is that it not only provides a practical and extremely effective way of scavenging sulfur-containing gases from gas streams containing them, but it also permits the practical recovery and production of manganese, copper, nickel, cobalt and other products from deep sea nodules. The values in the manganese nodules of manganese, copper, nickel, and cobalt, in particular, are rendered partially soluble in water by reaction with sulfur dioxide, and can be recovered from the spent nodules or from pregnant leaching solutions with which the spent nodules have been leached. The small proportion of the metal values that are not solubilized by sulfation are amenable to extraction from the residual solids by other well known and conventional techniques.

The process is operative over a wide range of temperatures at high efficiencies, from abient atmospheric temperatures to considerably elevated temperatures such as those encountered in the discharge gases of furnaces.

While the invention has been described herein by reference to the details of preferred embodiments thereof, it is to be understood that this disclosure is intended in an illustrative rather than a limiting sense, and it is contemplated that various modifications in the process of this invention will readily occur to those skilled in the art, within the spirit of the invention and the scope of the appended claims.

I claim:

1. A process for removing sulfur-containing gases from a gas stream comprising:
   providing a loose-packed, columnar bed of manganese nodule bodies,
   passing said gas stream through said bed until the nodules have absorbed a substantial percentage of their own weight of sulfur-containing gaseous materials,
   removing from the bed those nodule bodies that have absorbed up to about 25% of their own weight of sulfur-containing materials,
   washing the removed nodule bodies to expose fresh absorbing surfaces thereof, returning the washed nodule bodies to the bed, and then continuing the process by passing the gas stream through said nodules.

2. A process in accordance with claim 1 wherein the bed is formed from nodule fragments that are irregular in shape and that are graded in size so that the largest dimension of any fragment does not exceed about one inch.

3. A process in accordance with claim 1 including the additional step of leaching the bed with an aqueous stream flowing countercurrent to the gas stream.

4. A process in accordance with claim 1 including the additional step of leaching the bed with a solution of sulfuric acid flowing countercurrent to the gas stream.

5. A process in accordance with claim 1 wherein sulfur-containing gas in the gas stream is predominantly sulfur dioxide, at a concentration in the gas stream on the order of 25 parts per million.

6. A process in accordance with claim 1 wherein the sulfur-containing gas is sulfur dioxide, at a concentration in the gas stream on the order of 0.35%.

7. A process in accordance with claim 1 wherein the sulfur-containing gas is sulfur dioxide, at a concentration in the gas stream on the order of 1%.

8. A process in accordance with claim 1 wherein the temperature at the point where the gas stream passes into the bed is on the order of about 275° F. to about 350° F.

9. A process in accordance with claim 1 wherein the temperature at the point where the gas stream passes into the bed is on the order of from about 350° F. to about 400° F.

10. A process in accordance with claim 1 wherein the gas stream is passed through the bed at an hourly space velocity of up to about 1000.

11. A process for removing sulfur-containing gases from a gas stream comprising:
providing a loose-packed, columnar bed of manganese nodule bodies,
passing said gas stream through said bed until the nodules have absorbed a substantial percentage of their own weight of sulfur-containing gaseous materials,
removing from the bed those nodule bodies that have absorbed up to about 25% of their own weight of sulfur-containing gaseous materials for recovery of the soluble metal values in said nodule bodies, and then
continuing the process by passing the gas stream through said nodules.

12. A process in accordance with claim 11 wherein the gas stream is passed through said bed of nodules at an hourly space velocity up to 250.

13. A cyclic process for removing sulfur-containing gases from a gas stream comprising:
providing a loose-packed, columnar bed of manganese nodule bodies,
passing said gas stream upwardly through said bed until at least the lowermost of the nodules have absorbed from about 15% to about 25% of their own weight of sulfur-containing material,
removing from the bed those nodule bodies that have absorbed from about 15% to about 25% of their own weight of sulfur-containing material,
washing the removed nodules to expose fresh absorbent surfaces, and
returning the washed nodule bodies to the column.

14. A process in accordance with claim 13 including the additional steps of separating and recovering the material washed from the nodule surfaces, for recovery of soluble metal values therefrom.

15. A process in accordance with claim 13 wherein the gas stream is atmospheric air that is polluted with sulfur dioxide and wherein the hourly space velocity of the gas stream through the bed is up to about 250.

16. A process for removing from a gas stream sulfur-containing gases comprising predominantly sulfur dioxide, comprising:
comminuting manganese nodules to form irregular fragments having a largest dimension that does not exceed one inch,
disposing said nodule fragments in a loose-packed, substantially static columnar bed,
passing said gas stream upwardly through said bed until at least the lowermost nodule fragments have absorbed up to about 20% of their own weight of sulfur-containing gases from the gas stream,
removing from the bed those nodule fragments that have absorbed up to about 20% of their own weight of sulfur-containing materials,
washing the sulfated nodule fragments that have been removed from the bed, to expose fresh fragment surfaces available for further absorption, and
returning the washed nodule fragments to the column, to permit the gas stream to contact the fresh, absorbent surfaces of the washed fragments.

17. A process in accordance with claim 16 wherein the hourly space velocity of the gas stream through the bed is up to about 1000.

18. A process in accordance with claim 16 wherein the temperature at the point where the gas stream passes into the bed is up to about 400° F.

References Cited

UNITED STATES PATENTS

| | | | |
|---|---|---|---|
| 2,984,545 | 5/1961 | Tarbutton et al. | 23—178 |
| 2,992,895 | 7/1961 | Feustel et al. | 23—178 X |
| 3,150,923 | 9/1964 | Bienstock et al. | 55—73 |

FOREIGN PATENTS

| | | |
|---|---|---|
| 909,108 | 10/1962 | Great Britain. |

REUBEN FRIEDMAN, *Primary Examiner.*

J. ADEE, *Assistant Examiner.*